Nov. 28, 1967 H. BRAUS 3,355,647

SUBMULTIPLE LINE FREQUENCY CONVERTER

Filed May 21, 1965 2 Sheets-Sheet 1

INVENTOR.
HAROLD BRAUS

BY Ernest J. Weinberger
John W. Pease
ATTORNEYS

INVENTOR.
HAROLD BRAUS
BY Ernest J. Weinberger
John M. Pearn
ATTORNEYS

United States Patent Office 3,355,647
Patented Nov. 28, 1967

3,355,647
SUBMULTIPLE LINE FREQUENCY CONVERTER
Harold Braus, Norwalk, Conn., assignor, by mesne assignments, to the United States of America as represented by the Secretary of the Navy
Filed May 21, 1965, Ser. No. 457,882
7 Claims. (Cl. 318—171)

ABSTRACT OF THE DISCLOSURE

The signal of the frequency to be down converted is applied to a dual type rectifier which may be gate controlled rectifiers or mechanical switch whose pole contacts are controlled by the polarity of the signal itself so as to be fully synchronized. The output consists of two fully rectified signals of opposite polarity. They are applied to the stationary contacts of an electronic switch whose contacts are controlled by a signal from a multivibrator whose frequecny is a sub-multiple of the signal to be down converted. The resultant output to a load connected across the electronic switch is the alternate application of a fully rectified signal of one polarity and then one of the opposite polarity at an overall frequency of the multivibrator. Various embodiments of this principle are illustrated.

This invention relates to frequency conversion and more particularly to the downward conversion to submultiples of a power line frequency.

With the advent of various forms of power supplies mainly in frequency variation, necessitated by the types and requirements of electronic equipment, a number of different supplies are generally found in one location. This is particularly true in aircraft and naval vessels where both size, weight and complexity of the operating systems requires a different supply for each. As for example, a 400-cycle source is employed for synchros and navigational equipment aboard ships. Although this equipment is special in and of itself there are associated therewith other components which are in general use and may be referred to as being of a commercial nature. These of course, are manufactured to operate from the standard 60-cycle supply which is generally available. When these devices are to be operated together, it is of course necessary to supply each with its proper form of electrical energy. For both convenience and economy, it is desirable to be capable of operating all equipment from a single electrical source. This becomes almost essential where only a minor portion of the components or equipment are operable from a source different from that employed by the major portion of the equipment. One such combination is a 60-cycle motor used with navigation equipment which equipment operates from a 400-cycle source.

It is therefore an object of this invention to provide a simple, inexpensive, efficient and dependable power frequency converter.

It is a further object to provide a power frequency converter which does not employ any moving parts and is of simple, reliable, electrical circuitry requiring little or no maintenance.

Other objects and advantages will appear from the following description of an example of the invention, and the novel features will be particularly pointed out in the appended claims.

Figure 1:
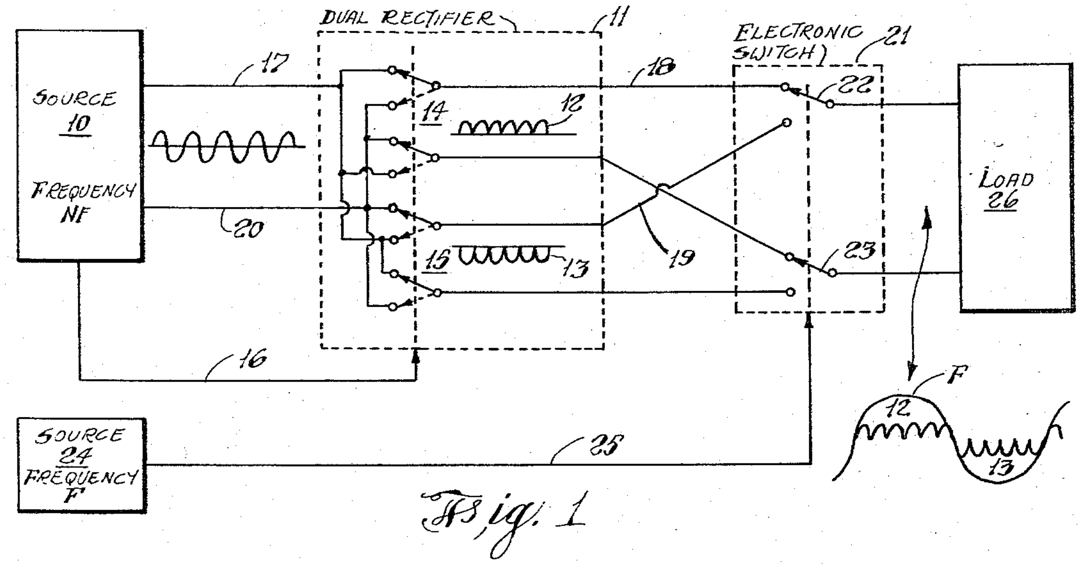
FIG. 1 is a block diagram of an embodiment of the invention.

In the embodiment of the invention of FIG. 1, a source 10 of power frequency NF applies its output to what is termed a dual rectifier 11 which rectifies the input from the source 10 and produces a pair of rectified outputs 12 and 13 which are of opposite polarity. The rectifier 11 may be of any conventional form provided it supplies the outputs as shown. It has been illustrated for convenience in a mechanical form wherein a pair of coupled double-pole, double-throw switches 14 and 15 whose pole contacts are activated by the polarity of the output of the source 10 via line 16.

Under this condition, the operation of the coupled switches is synchronized with the frequency NF and for the switch positions as shown if the upper line 17 is positive then line 18 is also positive while line 19 is negative. On the next half cycle line 20 is positive and the switch assumes the other position shown in dotted form so that lines 18 and 19 retain the same polarity. The output of the rectifier is fed to a switch 21 whose coupled poles 22, 23 are synchronized with the frequency F of source 24 via line 25, so that the output to load 26 of this switch is alternately positive and negative in accordance with the polarity of the source 24. This switch in effect combines the outputs of the dual rectification so as to effectively produce an alternating current of a frequency equal to that of source 24.

Figure 2:
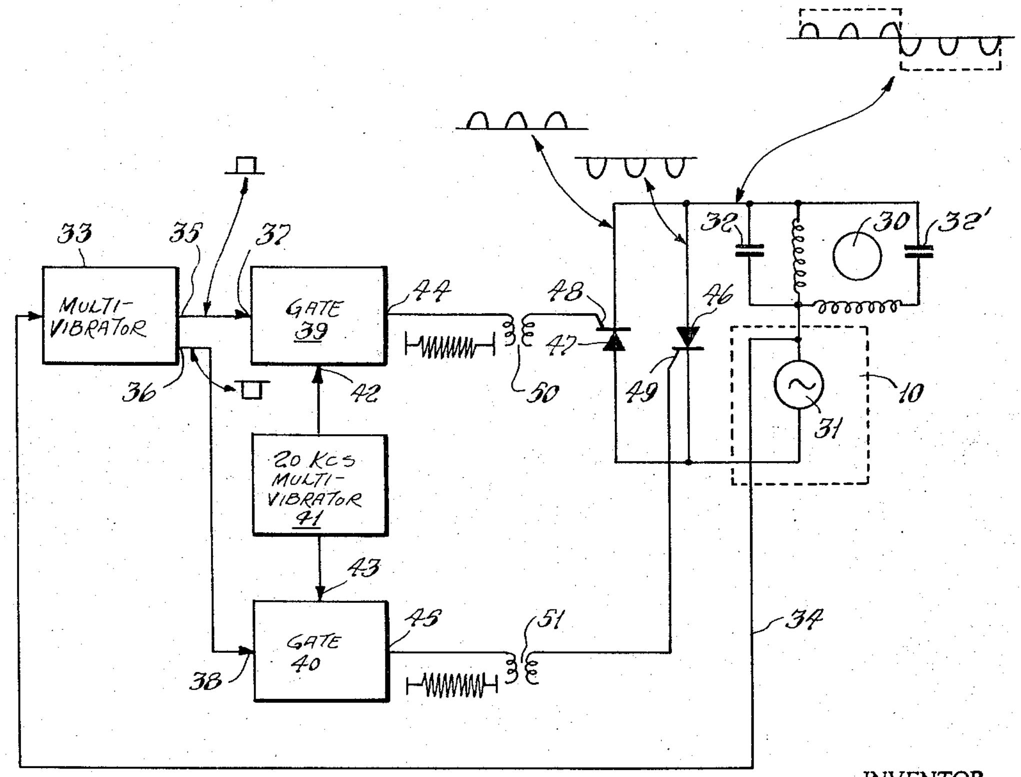
FIG. 2 is a diagram partly in block form of another embodiment made in accordance with the principles of this invention; and, FIG. 3 is still another embodiment of this invention.

In the illustrated embodiment of the invention of FIG. 2, which, for purposes of example, is applied to operating a 60-cycle motor 30 from a 400-cycle source 31, the motor to be driven is substantially an inductive load and can therefore be simply represented by the combination of inductances as shown realizing that there is also an associated resistance (not shown). Since this motor, as constructed, employs a 60-cycle power input and 60 is not a multiple of 400, a pair of capacitors 32 and 32' are connected across the inductors to resonate therewith at a frequency of 66.6 cycles per second and permit the more efficient use of the motor at the frequency which is a multiple of 400 cycles. The converter of this invention is designed to supply power at such a frequency.

A monostable multivibrator or flip-flop 33 whose time constant has been adjusted to provide an output pulse of a duration so as to produce an output of 66.6 cycles per second. By synchronizing the multivibrator to the 400-cycle source via line 34 the cross-over at 66.6 cycles corresponds to the zero cross-over of the 400 cycles. The multivibrator 30 which is acting as a synchronized frequency divider may be of any well known type and design. One satisfactory embodiment of a suitable multivibrator is fully described on pages 19 and 20 of a volume entitled, "Digital Counters and Computers," by Ed. Bukstein, published by Rinehart and Co., Inc., New York in 1960. Assuming, for the sake of simplicity, that the outputs from multivibrator 33 are those taken at the plates of the tubes or the collectors of the transistors and as is conventional, one is conducting while the other is cut off, then this corresponds to a dual bistable device. One output will be a voltage V while the other will be some low or zero voltage. These conditions corerspond to the "1" and "0" of digital terminology. These outputs are indicated at 35 and 36 for one-half cycle and are reversed for the other half.

The outputs 35 and 36 of the synchronized multivibrator 33 are applied to the control inputs 37 and 38 of gates 39 and 40, respectively. These gates are well known in the art and an example of one such suitable circuit is fully described on pages 76 to 84 of "Digital Counter and Computers" which volume is mentioned hereinbefore. A free running multivibrator 41 which is also well known in the art and described on pages 192 to 194 of "Radar Electronic Fundamentals" NAVSHIPS 900,016, published by the Bureau of Ships, Department of the Navy, in June 1944, provides a signal whose frequency is high compared to the source 31 and in this case assume a frequency of 20 kc. The output of this multivibrator is applied to the signal inputs 42 and 43 of the gates. The 20 kc. signal is gated through the gates 39 and 40 under the control of the signal at control inputs 37 and 38. That is when the input is "1" at gate 39, then the gate passes the 20 kc. signal therethrough to the output terminal 44. When the input is "0" no output appears at 44. This same circumstance occurs at gate 40 except that they are reversed or their outputs alternate. It is evident from the foregoing that for alternate half cycles of multivibrator 33 a 20 kc. signal alternately appears at outputs 44 and 45.

A pair of silicon controlled rectifiers 46 and 47 are connected in parallel with their anodes and cathodes joined so as to produce a bidirectional rectifier. SCR's are presently known in all fields and suffice it to state they are much like an ordinary rectifier which has been modified to block in the forward direction until a small signal is applied to the gate or trigger electrode. After the gate signal is applied, the SCR conducts in the forward direction and continues to do so even when the gate signal is removed. The SCR cuts itself off when the applied (cathode-anode) potential is reversed and does not commence to conduct again in the forward direction until the gate or trigger signal is restored. The SCR is very similar to the gas thyraton in both characteristics and operation. The trigger electrodes 48 and 49, of the SCR's are coupled by way of transformers 50 and 51 to the gate outputs. These transformers serve to decouple the control circuitry from the power source. Further, by employing a relatively high frequency signal at the control electrodes of the SCR's they are effectively "on" during the entire period for which the signal is applied even though the source 31 voltage has reversed its polarity.

Summarizing the operation, each SCR is made to conduct alternately for one-half a cycle of the multivibrator 33 (66.6 c.p.s.). Thus, if SCR 47 were conducting for the first half cycle, then all the rectified output of source 31 of one polarity would be applied to the motor 30, while for the other half cycle only the rectified current of the opposite polarity would be applied through SCR 46 to the motor (SCR 47 then being "off," no trigger signal). This effectively converts the 400-cycle power to 66.6 cycle power to the motor or stated another way, the SCR's function to switch respectively the positive and negative half waves of the 400-cycle current at a 66.6-cycle rate. The 60-cycle motor is thus resonated at 66.6 cycles per second and is thereby driven efficiently and reliably by the 400-cycle source through the simple circuit arrangement disclosed.

Figure 3:
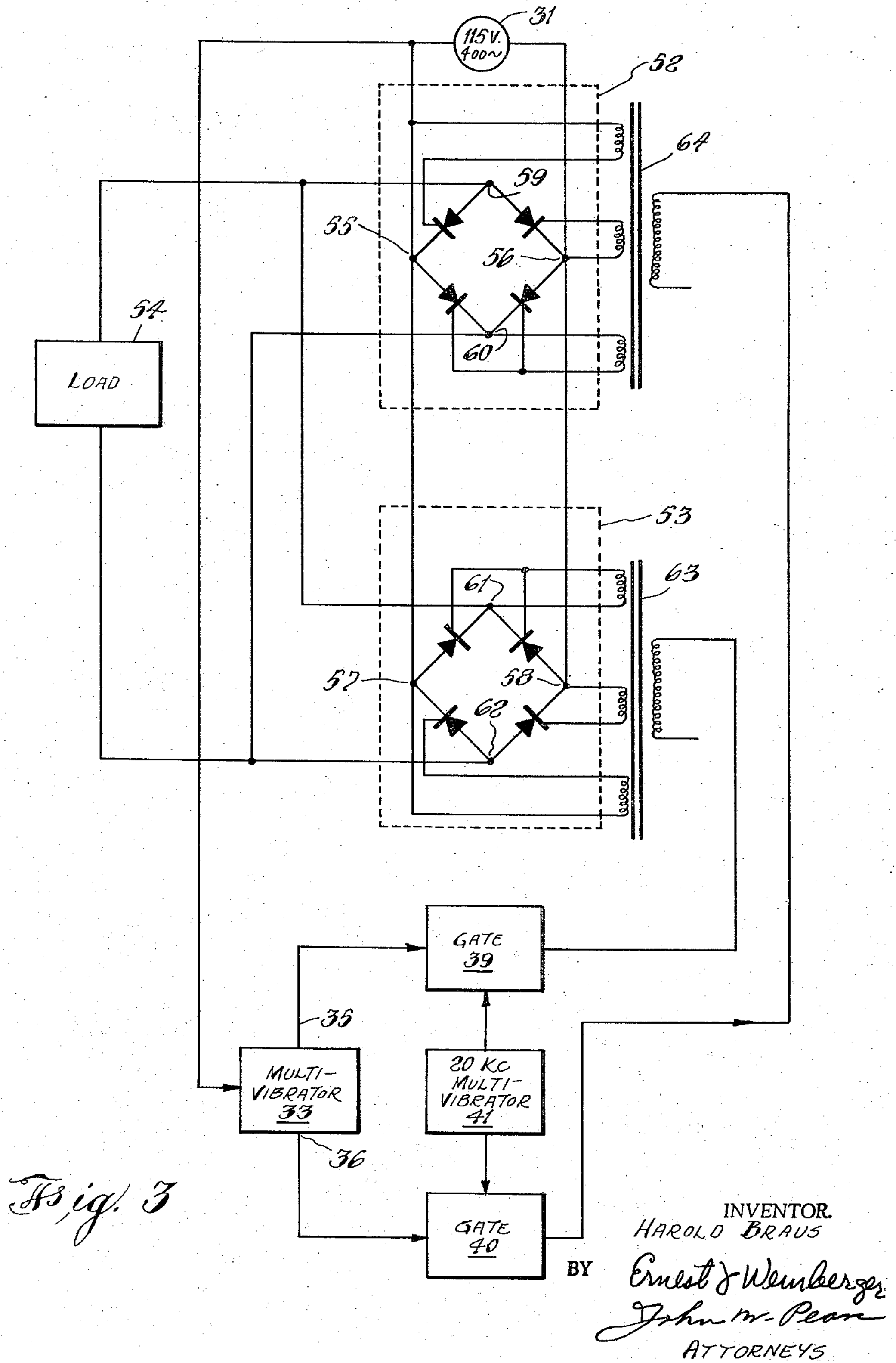

It is clear from the foregoing description of the embodiment of FIG. 2 that only half-wave rectification has been employed and that a certain portion of the available energy at the 400-cycle source cannot therefore be utilized. In order to provide full utilization, a pair of bridge rectifier circuits 52 and 53 as shown in FIG. 3 have been substituted for the individual rectifiers of FIG. 2. These bridges each comprising four SCR's are arranged in the standard fashion to form the full wave bridge. The input terminals 55, 56 and 57 and 58 of the bridges are tied in parallel across the 400-cycle source 31 while the output terminals 59–62 are paralleled across the load 54. A pair of transformers 63 and 64 couple the gate outputs from the primary windings to the triple secondaries which are connected between the trigger electrodes and the cathodes of the bridge SCR's. The interconnection of the windings and the electrodes was dictated in some respects to prevent shortcircuiting of the source and to minimize applying an overvoltage across the trigger electrodes. Each bridge is in itself a full wave rectifier and are each connected, so as to drive current in opposite directions through the load. Thus by controlling the activity of the bridges in a particular manner a selected frequency can be attained as hereinbefore described.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:.

1. A submultiple frequency converter which comprises:
- a source of frequency F,
- a multivibrator having a pair of outputs for alternately providing a gate pulse of a period *N/F*, where said N is an integer, at said outputs,
- a pair of gate circuits each having control input, and a signal input and an output, said signal input being connected thereby to said output only when a pulse is applied to the control input,
- a source of high frequency energy,
- said source of high frequency energy connected to the said signal inputs of said gates,
- said outputs of said multivibrator each connected to one of said control inputs of said gates,
- a pair of rectifiers each having an anode, a cathode and a trigger electrode, said rectifiers connected in parallel with the anodes connected to the cathodes, said trigger electrodes connected to said gate outputs,
- a pair of load terminals,
- a series path including therein said rectifiers connected in parallel, said source of frequency F and said load terminals.

2. The converter according to claim 1 further including means for frequency synchronizing said multivibrator with said source of frequency F.

3. The converter according to claim 2 wherein said rectifiers are silicon controlled rectifiers.

4. The converter according to claim 3 further including transformer coupling means disposed between said gate output and said trigger electrode.

5. A circuit for operating an electric motor from a source of power having a frequency F greater than that normally used for energizing said motor which comprises:
- tuning means connected across the terminals of said motor for resonating with said motor components at a frequency (N), which is a submultiple of F and approximately equal to the frequency normally used for energizing said motor,
- a multivibrator having a pair of outputs for alternately providing a gate pulse of a period equal to *1/N*,
- a pair of gate circuits each having a control input, a signal input and an output, said signal input being connected thereby to said output only when a pulse is applied to the control input,
- a source of high frequency energy,
- said source of high frequency connected to the said signal inputs of said gates,
- a pair of rectifiers each having an anode, a cathode and a trigger electrode, said rectifiers connected in parallel with the anodes connected to the cathodes and said trigger electrodes connected to said gate outputs,
- a series path including therein said rectifiers connected in parallel, said source of power and the terminals of said motor.

6. The circuit according to claim 5 further including means for frequency synchronizing said multivibrator with said source of power.

7. The circuit according to claim 6 wherein said tuning means includes a capacitor.

References Cited

UNITED STATES PATENTS

| | | | |
|---|---|---|---|
| 2,899,566 | 8/1959 | Ware et al. | 321—61 XR |
| 3,083,326 | 3/1963 | Deming et al. | 318—171 XR |
| 3,089,992 | 5/1963 | Seney | 318—171 |
| 3,152,297 | 10/1964 | Peaslee | 321—61 |
| 3,246,231 | 4/1966 | Clarke | 321—69 |
| 3,256,244 | 6/1966 | Byloff et al. | 321—61 |
| 3,287,622 | 11/1966 | Eckenfelder et al. | 321—69 |

ORIS L. RADER, *Primary Examiner.*

G. Z. RUBINSON, *Assistant Examiner.*